(12) United States Patent
Kouno et al.

(10) Patent No.: US 10,389,204 B2
(45) Date of Patent: Aug. 20, 2019

(54) ELECTRIC ACTUATOR

(71) Applicant: DENSO CORPORATION, Kariya, Aichi-pref. (JP)

(72) Inventors: Naoaki Kouno, Kariya (JP); Hiroki Shimada, Kariya (JP); Tetsuji Yamanaka, Kariya (JP); Etsugo Yanagida, Kariya (JP)

(73) Assignee: DENSO CORPORATION, Kariya (JP)

(*) Notice: Subject to any disclaimer, the term of this patent is extended or adjusted under 35 U.S.C. 154(b) by 67 days.

(21) Appl. No.: 15/736,804

(22) PCT Filed: Jun. 7, 2016

(86) PCT No.: PCT/JP2016/002750
§ 371 (c)(1),
(2) Date: Dec. 15, 2017

(87) PCT Pub. No.: WO2016/203735
PCT Pub. Date: Dec. 22, 2016

(65) Prior Publication Data
US 2018/0191221 A1 Jul. 5, 2018

(30) Foreign Application Priority Data
Jun. 18, 2015 (JP) ................. 2015-123157

(51) Int. Cl.
*H02K 7/06* (2006.01)
*H02K 5/22* (2006.01)
(Continued)

(52) U.S. Cl.
CPC ................. *H02K 5/22* (2013.01); *F16H 1/06* (2013.01); *F16H 57/03* (2013.01); *F16H 57/032* (2013.01);
(Continued)

(58) Field of Classification Search
CPC ........ H02K 5/22; H02K 7/116; H02K 11/215; H02K 7/14; H02K 7/088
See application file for complete search history.

(56) References Cited

U.S. PATENT DOCUMENTS

| 6,018,206 A | * | 1/2000 | Corbett ................ H02K 5/1672 310/45 |
| 2001/0026105 A1 | | 10/2001 | Torii et al. |
| 2005/0039571 A1 | | 2/2005 | Takabayashi et al. |
| 2012/0145134 A1 | * | 6/2012 | Miyazaki ............... F02D 9/1065 123/568.2 |
| 2013/0106219 A1 | * | 5/2013 | Schneider ................ H02K 5/16 310/89 |

(Continued)

FOREIGN PATENT DOCUMENTS

| DE | 10 2012 10005 | 7/2013 |
| JP | 2010-136587 | 6/2010 |

(Continued)

OTHER PUBLICATIONS

International Search Report for PCT/JP2016/002750, dated Jul. 12, 2016, 4 pages.

*Primary Examiner* — Thanh Lam
(74) *Attorney, Agent, or Firm* — Nixon & Vanderhye P.C.

(57) ABSTRACT

A plurality of reinforcing ribs, which extend from a cover-side bearing in an outer radial direction, is formed at a portion of a cover, at which a reaction force generated in response to operation of an electric actuator is applied. The reinforcing ribs can improve strength of the portion of the cover, at which the reaction force is applied. Therefore, it is possible to avoid a damage, such as deformation, a crack, at the resin cover caused by the reaction force applied to the cover.

6 Claims, 10 Drawing Sheets

(51) Int. Cl.
    *F16H 1/06*     (2006.01)
    *F16H 57/03*     (2012.01)
    *H02K 5/04*     (2006.01)
    *H02K 7/116*     (2006.01)
    *H02K 11/215*     (2016.01)
    *H02K 7/08*     (2006.01)
    *H02K 7/14*     (2006.01)
    *F16H 57/032*     (2012.01)
    *F16H 57/02*     (2012.01)

(52) U.S. Cl.
    CPC ............... *H02K 5/04* (2013.01); *H02K 5/225* (2013.01); *H02K 7/088* (2013.01); *H02K 7/116* (2013.01); *H02K 7/14* (2013.01); *H02K 11/215* (2016.01); *F16H 2057/02034* (2013.01); *F16H 2057/02082* (2013.01)

(56) References Cited

U.S. PATENT DOCUMENTS

| | | | |
|---|---|---|---|
| 2013/0140477 A1* | 6/2013 | Shimane | H02K 7/116 251/129.01 |
| 2018/0172120 A1* | 6/2018 | Kouno | F16H 1/06 |
| 2018/0187791 A1* | 7/2018 | Yamanaka | F16H 1/06 |
| 2018/0259088 A1* | 9/2018 | Yamanaka | F01D 17/16 |

FOREIGN PATENT DOCUMENTS

| | | |
|---|---|---|
| JP | 2012-034532 | 2/2012 |
| WO | WO 2016/203733 | 12/2016 |
| WO | WO 2016/203734 | 12/2016 |
| WO | WO 2016/203736 | 12/2016 |

* cited by examiner (a)

(b)

(c)

ELECTRIC ACTUATOR

CROSS REFERENCE TO RELATED APPLICATION

This application is the U.S. national phase of International Application No. PCT/JP2016/002750 filed Jun. 7, 2016 which designated the U.S. and claims priority to Japanese Patent Application No. 2015-123157 filed on Jun. 18, 2015, the entire contents of each of which are hereby incorporated by reference.

TECHNICAL FIELD

The present disclosure relates to an electric actuator that transmits a rotational output of an output shaft to a subject through an actuator lever.

BACKGROUND ART

A technique disclosed in the patent literature 1 is known as an example of an electric actuator, which transmits a rotational output of an output shaft to a subject through an actuator lever.

One end of the output shaft of the patent literature 1 is rotatably supported by a bearing (hereinafter referred to as a housing-side bearing) that is placed between a housing and the output shaft.

Furthermore, the other end of the output shaft is rotatably supported by a bearing (hereinafter referred to as a cover-side bearing) that is placed between a cover and the output shaft.

When the drive force is transmitted from the output shaft to the subject through the actuator lever, a reaction force is generated from the output shaft to the cover-side bearing.

This reaction force is transmitted to the cover through the cover-side bearing. Therefore, the cover is required to have a sufficient strength that is sufficient to withstand the reaction force applied thereto.

The cover-side bearing of the patent literature 1 is supported by the cover made of resin.

The strength of the resin is equal to or small than one half of the strength of a steel material.

Therefore, in a case where the cover-side bearing, which receives the reaction force, is supported by the cover that is made of the resin and has a generally constant plate thickness, when the reaction force is applied to the portion of the cover, which supports the cover-side bearing, a damage, such as deformation, a crack, may possibly be generated at the portion of resin cover. As a result, the long term reliability of the electric actuator is deteriorated.

CITATION LIST

Patent Literature

Patent Literature 1: DE102012100054A1

SUMMARY OF INVENTION

The present disclosure is made in view of the above disadvantage, and it is an objective of the preset disclosure to provide an electric actuator that limits generation of a damage, such as deformation, a crack, at a resin cover upon application of a reaction force to the cover.

In an electric actuator according to one aspect of the present disclosure, a reinforcing rib is formed in a reaction force generating range of a cover. The strength of the reaction force generating range of the cover can be improved with this reinforcing rib. Thereby, even though the cover is made of the resin, it is possible to avoid a disadvantage of generating a damage, such as deformation, a crack, at the cover upon application of a reaction force to the cover. Therefore, the reliability of the electric actuator can be improved.

In another electric actuator according to another aspect of the present disclosure, a thick wall portion is formed at a reaction force generating range of the cover. The strength of the reaction force generating range of the cover can be improved with the thick wall portion. Therefore, it is possible to avoid the disadvantage of generating the damage, such as the deformation, the crack, at the resin cover upon application of the reaction force to the cover. As a result, the reliability of the electric actuator can be improved.

DESCRIPTION OF EMBODIMENTS

Figure 1:
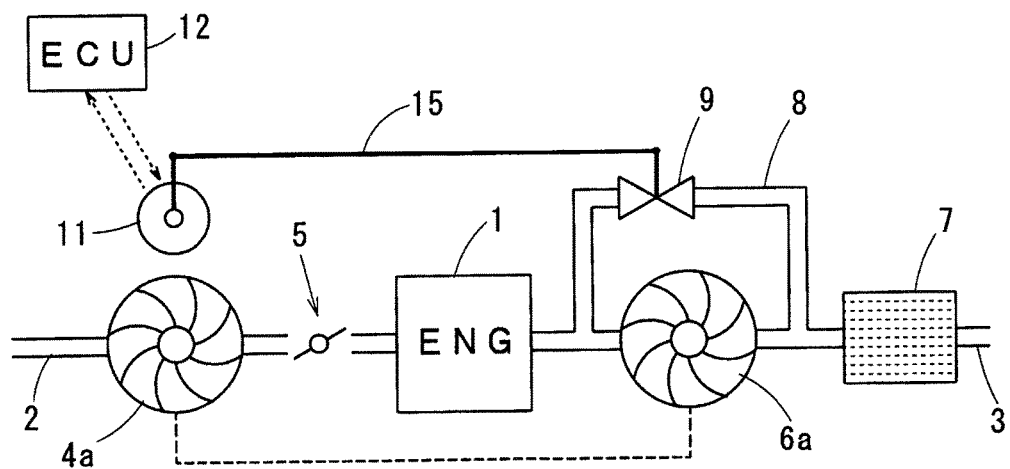
FIG. 1 is a schematic diagram of an engine intake and exhaust system according to a first embodiment of the present disclosure.
Figure 2:
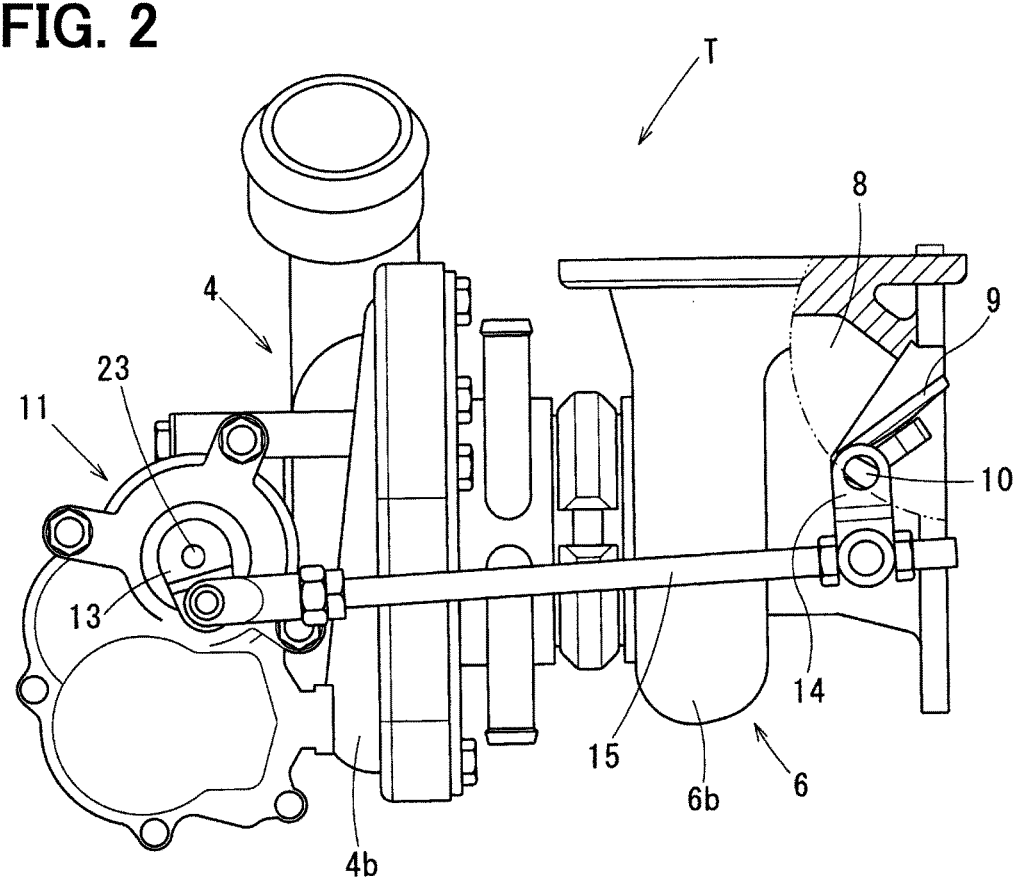
FIG. 2 is a descriptive view of a turbocharger of the first embodiment.
Figure 3:
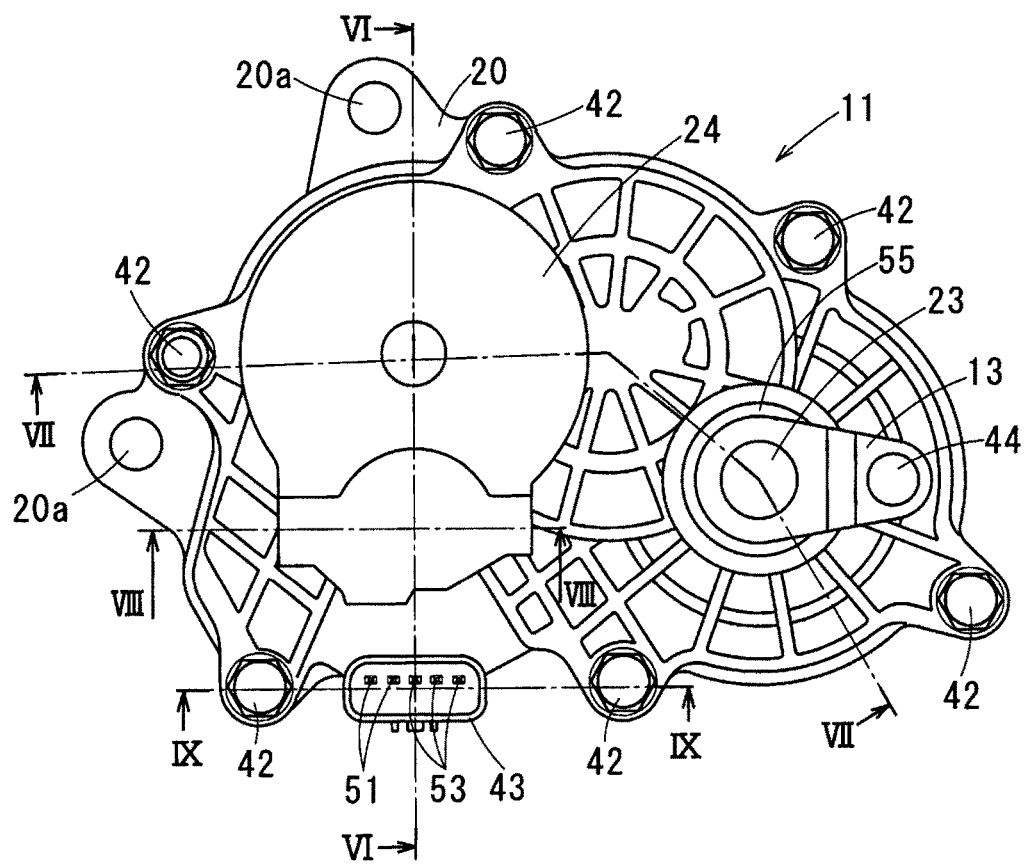
FIG. 3 is a top view of an electric actuator of the first embodiment.

Various embodiments for implementing the invention will be described with reference to the drawings. Here, it should be noted that the following embodiments are merely examples, and the present invention should not be limited to the following embodiments.

First Embodiment

A first embodiment will be described with reference to FIGS. 1 to 13(c). An engine 1, which is installed in a vehicle and drives the vehicle, has an intake passage 2, which guides intake air to cylinders of the engine 1, and an exhaust passage 3, which discharges exhaust gas generated in the cylinders to the atmosphere.

An intake air compressor 4 of a turbocharger T and a throttle valve 5 for adjusting the amount of intake air supplied to the engine 1 are installed to the middle of the intake passage 2.

An exhaust gas turbine 6 of the turbocharger T and a catalyst 7 for purifying the exhaust gas are installed to the middle of the exhaust passage 3. The catalyst 7 is a known three-way catalyst having a monolithic structure. The catalyst 7 purifies noxious components contained in the exhaust gas through chemical oxidation and chemical reduction upon increasing of the temperature of the catalyst 7 to an activation temperature.

The exhaust gas turbine 6 includes: a turbine wheel 6a, which is rotated by the exhaust gas discharged from the engine 1; and a turbine housing 6b, which is shaped into a vortex form and receives the turbine wheel 6a.

The intake air compressor 4 includes: a compressor wheel 4a, which is rotated by a rotational output of the turbine wheel 6a upon receiving the same; and a compressor housing 4b, which is shaped into a vortex form and receives the compressor wheel 4a.

A bypass passage 8, which conducts the exhaust gas while bypassing the turbine wheel 6a, is formed at the turbine housing 6b.

The bypass passage 8 directly guides the exhaust gas, which flows into the turbine housing 6b, to an exhaust gas outlet of the turbine housing 6b. This bypass passage 8 is configured to be openable and closable by a wastegate valve 9.

The wastegate valve 9 is a swing valve that is rotatably supported in an inside of the turbine housing 6b. Specifically, the wastegate valve 9 is rotated through a valve shaft 10 that is supported such that the valve shaft 10 is rotatable relative to the turbine housing 6b.

The wastegate valve 9 adjusts an opening degree of the bypass passage 8 to control a boost pressure generated by the turbocharger T at the time of operating the engine 1 at, for example, a high rotational speed.

Furthermore, the wastegate valve 9 fully opens the bypass passage 8 to warm up the catalyst 7 when the temperature of the catalyst 7 has not yet reached the activation temperature at the time of, for example, immediately after cold start of the engine 1. In this way, the high temperature exhaust gas, from which the heat is not taken by the turbine wheel 6a, can be guided to the catalyst 7, so that the rapid warm-up of the catalyst 7 can be executed.

The turbocharger T includes an electric actuator 11 as a means for rotating the wastegate valve 9. An ECU 12, which executes an engine control operation, controls energization of the electric actuator 11.

The electric actuator 11 is installed to the intake air compressor 4, which is remote from the exhaust gas turbine 6, for the purpose of avoiding an influence of the heat of the exhaust gas. As discussed above, the electric actuator 11 is installed at the location that is remote from the wastegate valve 9. Therefore, the turbocharger T has a link mechanism that conducts an output of the electric actuator 11 to the wastegate valve 9.

The link mechanism is a so-called four-bar linkage and includes: an actuator lever 13 that is rotated by the electric actuator 11; a valve lever 14 that is coupled to the valve shaft 10; and a rod 15 that conducts a rotational torque, which is applied to the actuator lever 13, to the valve lever 14.

Now, the electric actuator 11 will be described.

The electric actuator 11 includes: a housing 20 that is installed to the intake air compressor 4; an electric motor 21 that is installed in the housing 20; a speed reducing device 22; an output shaft 23; a cover 24; and an actuator lever 13 that is fixed to a distal end part of the output shaft 23.

The housing 20 has an opening portion a that opens toward one side.

Hereinafter, for the descriptive purpose, a direction, in which the opening portion a opens, will be referred to as "upper", and an opposite direction will be referred to as "lower". This upper-to-lower direction should not limit an installation direction. Here, reference sign 20a shown in FIG. 3 indicates bolt insertion holes that are used at the time of assembling the electric actuator 11 to the intake air compressor 4.

The housing 20 is a die-cast product made of, for example, aluminum. The cover 24 is installed to an upper portion of the housing 20.

The electric motor 21 and the speed reducing device 22 are placed in a space β that is formed between the housing 20 and the cover 24.

The electric motor 21 converts an electric power to a rotational output and is installed in the housing 20. Specifically, the electric motor 21 is inserted into a motor insertion chamber γ, which is formed in the housing 20, and thereafter the electric motor 21 is fixed to the housing 20 with, for example, screws. The electric motor 21 is not necessarily limited to any particular type and may be, for example, a known direct current electric motor or a known stepping motor.

The speed reducing device 22 is installed in the housing 20. The speed reducing device 22 reduces a rotational speed of rotational output, which is generated by the electric motor 21. In this instance, the speed reducing device 22 is a speed reducing gear device of a parallel shaft type, which has a plurality of speed reducing stages.

Specifically, the speed reducing device 22 of the present embodiment has three speed reducing stages and includes: a pinion gear 26 that is driven by the electric motor 21; a first intermediate gear 27 that is rotated by the pinion gear 26; a second intermediate gear 28 that is rotated by the first intermediate gear 27; and a final gear 29 that is rotated by the second intermediate gear 28.

The pinion gear 26 is an external gear that has a small diameter and is fixed to the rotatable shaft of the electric motor 21.

The first intermediate gear 27 is a double gear that includes a first large diameter gear 27a and a first small diameter gear 27b, which are coaxial. The first intermediate gear 27 is rotatably supported by a first intermediate shaft 31 that is fixed to the housing 20. The pinion gear 26 and the first large diameter gear 27a are meshed with each other to form a first speed reducing stage.

As a specific example, a lower end part of the first intermediate shaft 31 is press-fitted into a first press-fitting hole 39, which is formed at the housing 20. Furthermore, an upper end part of the first intermediate shaft 31 is fitting into an inside of a first recess 61 that is formed at a lower surface of the cover 24.

Similar to the first intermediate gear 27, the second intermediate gear 28 is a double gear that includes a second large diameter gear 28a and a second small diameter gear 28b, which are coaxial. The second intermediate gear 28 is rotatably supported by a second intermediate shaft 32 that is fixed to the housing 20. The first small diameter gear 27b and the second large diameter gear 28a are meshed with each other to form a second speed reducing stage.

As a specific example, a lower end part of the second intermediate shaft 32 is press-fitted into a second press-fitting hole 40, which is formed at the housing 20. Furthermore, an upper end part of the second intermediate shaft 32 is fitting into an inside of a second recess 62 that is formed at the lower surface of the cover 24.

The final gear 29 is an external gear that has a large diameter and is fixed to the output shaft 23. The final gear 29 is formed only in a predetermined rotational range. The second small diameter gear 28b and the final gear 29 are meshed with each other to form a third speed reducing stage.

As discussed above, the final gear 29 is installed to the output shaft 23. Therefore, the output shaft 23 is driven by the rotational output that has the reduced rotational speed, which is reduced by the speed reducing device 22.

The cover 24 is assembled to the housing 20. As discussed above, the space β, which receives the electric motor 21 and the speed reducing device 22, is formed between the housing 20 and the cover 24. An upper portion of the output shaft 23 extends through the cover 24, so that an upper end part of the output shaft 23 is exposed to the outside of the cover 24.

The actuator lever 13 is a component that extends in the radial direction from the output shaft 23 and is rotated integrally with the output shaft 23. The actuator lever 13 conducts the rotational output of the output shaft 23 to a subject, to which the drive force is conducted. In the present embodiment, the drive subject, to which the drive force is conducted, is the wastegate valve 9 that includes the rod 15.

Specifically, the actuator lever 13 is fixed to the upper end part of the output shaft 23, which is exposed to the upper side of the cover 24. Although a fixing technique for fixing the output shaft 23 and the actuator lever 13 together should not be limited any particular one, for instance, crimping or welding is used to fix between the output shaft 23 and the actuator lever 13.

A pin 44, which is parallel to the output shaft 23, is installed to a rotating end part of the actuator lever 13. The pin 44 is a component that is rotatably connected to an end part of the rod 15 and conducts the rotational torque of the actuator lever 13 to the rod 15.

The electric actuator 11 includes a rotational angle sensor 35. The rotational angle sensor 35 senses a rotational angle of the output shaft 23, and thereby the rotational angle sensor 35 senses an opening degree of the wastegate valve 9.

The rotational angle sensor 35 is a contactless type and includes: a magnetic flux generating portion 36, which is rotated integrally with the output shaft 23; and a magnetic sensing device 37, which is installed to one of the cover 24 or the housing 20 and senses a magnetic flux generated from the magnetic flux generating portion 36. The rotational angle of the output shaft 23, which is sensed with the rotational angle sensor 35, is outputted to the ECU 12. Details of the rotational angle sensor 35 will be described later.

The ECU 12 is an engine control unit having a microcomputer and includes a control program for controlling energization of the electric actuator 11.

Specifically, the ECU 12 computes a target opening degree of the wastegate valve 9 that is suitable for an operational state of the engine 1 based on the operational state of the engine 1. Then, the ECU 12 executes a feedback control operation of the electric actuator 11 such that the sensed opening degree, which is sensed through the rotational angle sensor 35, coincides with the computed target opening degree. This boost pressure control operation is only one example, and the present disclosure should not be limited to this boost pressure control operation.

Furthermore, the ECU 12 executes the rapid warm-up of the catalyst 7 when the actual temperature or the predicted temperature of the catalyst 7 has not yet reached the activation temperature at the time of, for example, immediately after the cold start of the engine. Specifically, at the time of executing the rapid warm-up of the catalyst 7, the ECU 12 sets the opening degree of the wastegate valve 9 to a predetermined opening degree. As a result, it is possible to limit the heat of the exhaust gas from being taken away by the wastegate valve 9. This rapid warm-up control operation of the catalyst 7 is only one example, and the present disclosure should not be limited to this rapid warm-up control operation of the catalyst 7.

(First Characteristic Technique)

A housing-side bearing 33, which rotatably supports the output shaft 23 relative to the housing 20, is placed between the housing 20 and the output shaft 23.

Furthermore, the cover-side bearing 34, which rotatably supports the output shaft 23 relative to the cover 24, is placed between the cover 24 and the output shaft 23.

The housing-side bearing 33 and the cover-side bearing 34 may be a rolling bearing (e.g., a ball bearing or a roller bearing) or a plain bearing (e.g., a metal bearing).

In the present embodiment, the ball bearing is used as the housing-side bearing 33 and the cover-side bearing 34.

An outer peripheral surface of the housing-side bearing 33 is press-fitted to the housing 20. Furthermore, a lower side of the output shaft 23 is press-fitted to an inner peripheral surface of the housing-side bearing 33.

An outer peripheral surface of the cover-side bearing 34 is press-fitted to the cover 24. Specifically, the outer peripheral surface of the cover-side bearing 34 is press-fitted to a bearing holder 55, which will be described later. Furthermore, an upper side of the output shaft 23 is press-fitted to an inner peripheral surface of the cover-side bearing 34.

With this construction, the output shaft 23 is rotatably supported.

Now, a reaction force F will be described.

The output, which is generated from the electric actuator 11, is conducted from the output shaft 23 to the subject through the actuator lever 13. That is, the output is conducted from the actuator lever 13 to the wastegate valve 9 through the rod 15.

Figure 7:
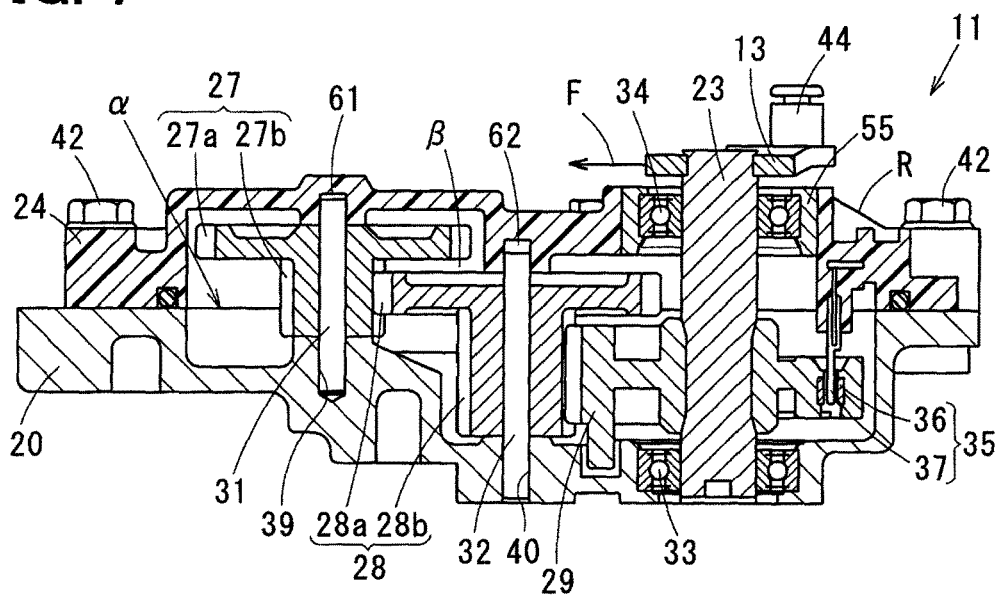
FIG. 7 is a cross-sectional view taken along line VII-VII in FIG. 3.
Figure 8:
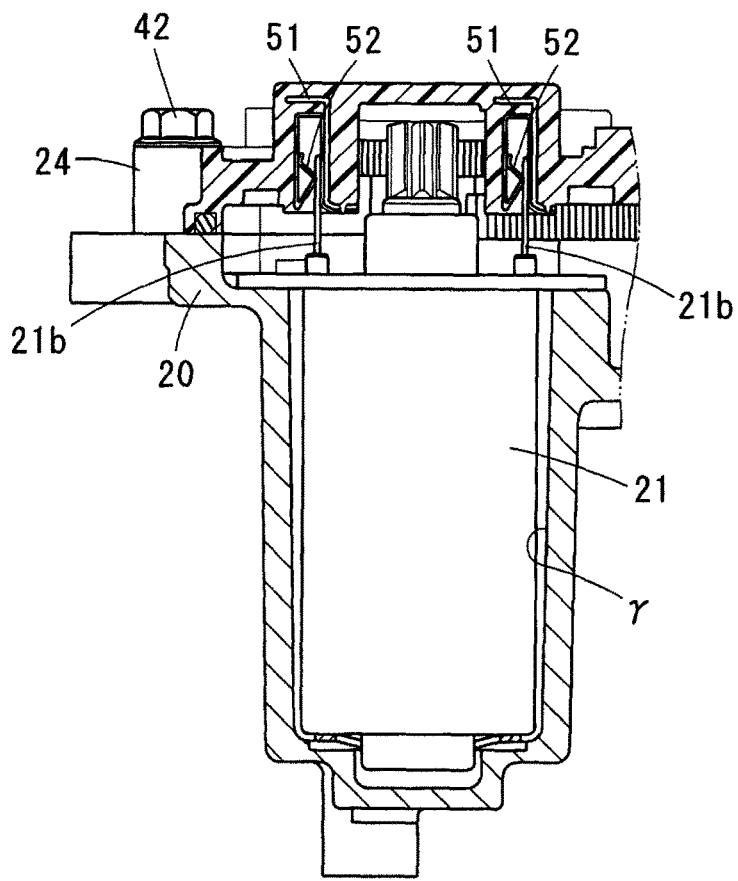
FIG. 8 is a cross-sectional view taken along line VIII-VIII in FIG. 3.
Figure 9:
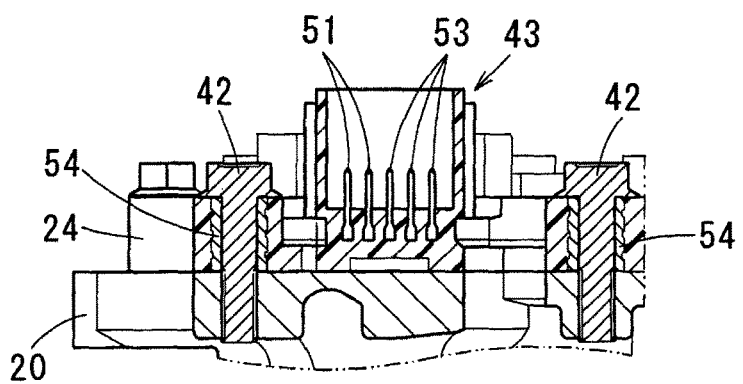
FIG. 9 is a cross-sectional view taken along line IX-IX in FIG. 3.

In the case where the wastegate valve 9 is driven by the output shaft 23 through the actuator lever 13 and the rod 15, a reaction force F is exerted from the output shaft 23 to the cover-side bearing 34 and the baring holder 55, as shown in FIG. 7. A direction of the reaction force F changes depending on the moment of inertia of the rod 15 or the lever at the time of the drive operation, and/or the contact state between the pin 44 and a hole of the rod. Therefore, the direction of the reaction force is not limited to the direction shown in FIG. 7.

Figure 10:
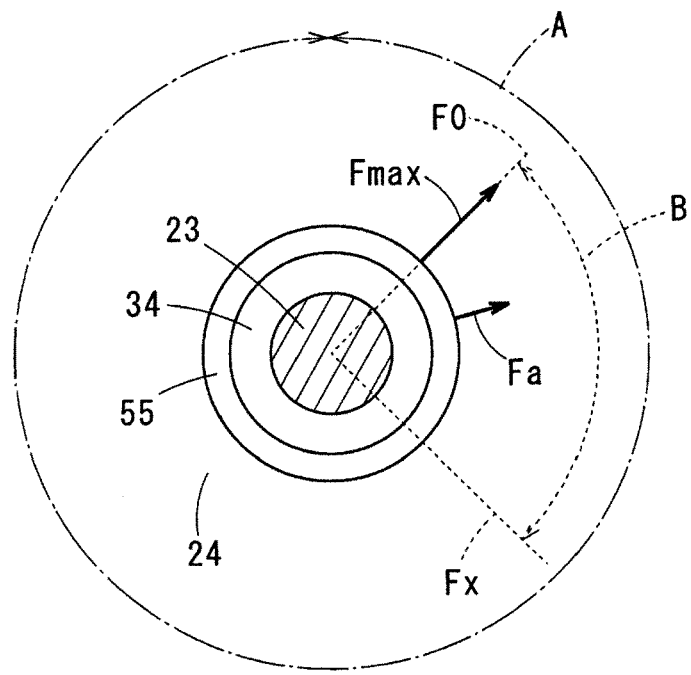
FIG. 10 is a descriptive diagram for describing a reaction force generation range.
Figure 11:
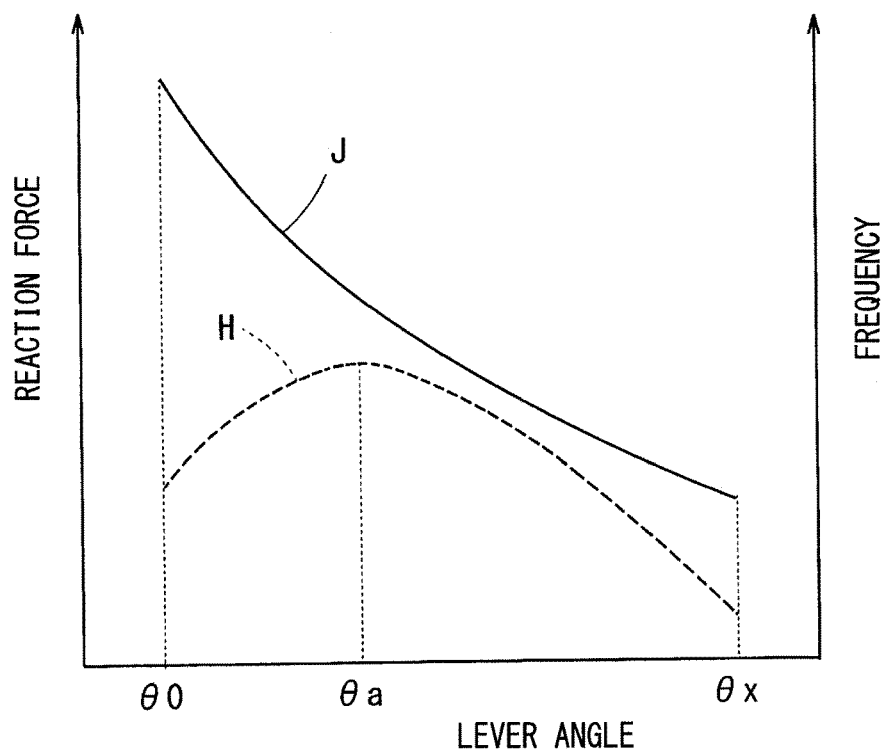
FIG. 11 is a graph showing a relationship between an opening degree of an output shaft and a reaction force and a relationship between the opening degree of the output shaft and an operation frequency.
Figure 12:
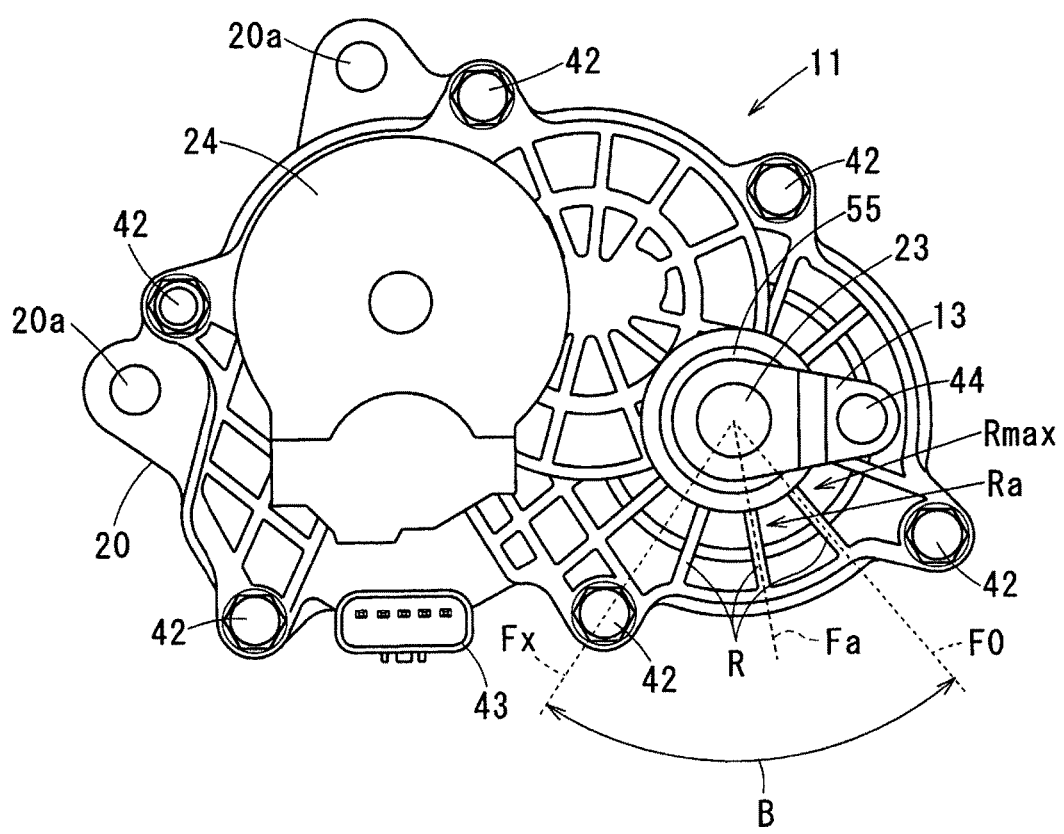
FIG. 12 is a descriptive diagram for describing a reinforcing rib formed at a cover of the first embodiment.
Figure 13:
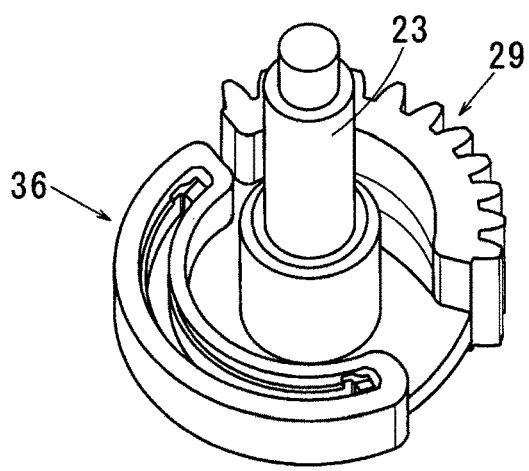
FIG. 13(a) is a perspective view of an output shaft, to which a resin component of a final gear of the first embodiment is fixed.
FIG. 13(b) is a perspective view of a magnetic flux generating portion to be insert-molded in the resin component.
FIG. 13(c) is a view of the output shaft taken in an axial direction.
Figure 13:
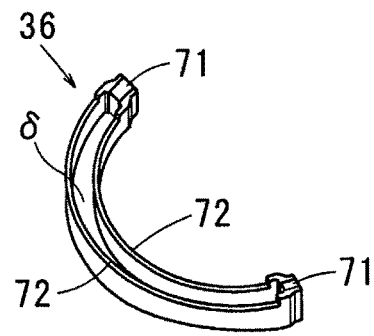
Figure 13:
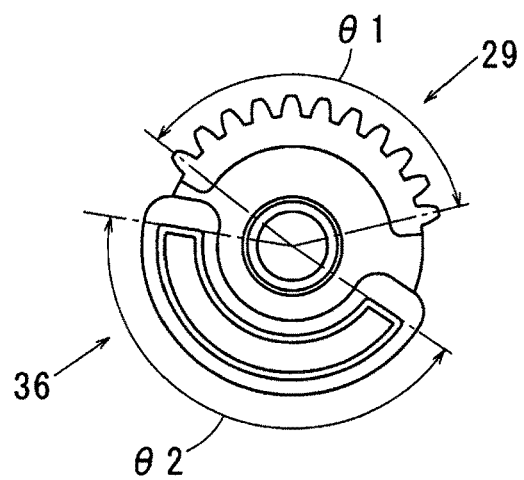

An exerting direction of the reaction force F, which is exerted from the output shaft 23 to the cover-side bearing 34, changes in response to an angular change of the actuator lever 13, as shown in FIG. 10.

Specifically, the actuator lever 13 shows the angular change from a full closing angle θ0, at which the wastegate valve 9 closes the bypass passage 8, to a maximum angle θx, at which the wastegate valve 9 opens the bypass passage 8 at a maximum degree.

Therefore, when the angle of the actuator lever 13 changes in a range from the full closing angle θ0 to the maximum angle θx, the exerting direction of the reaction force F changes in a range from an exerting direction F0 of the reaction force F at the full closing angle θ0 to an exerting direction Fx of the reaction force F at the maximum angle θx.

Here, a portion of the cover 24, which is placed around the cover-side bearing 34, is defined as a bearing support range A. That is, the portion of the cover 24, which supports the cover-side bearing 34, is defined as the bearing support range A.

Furthermore, a circumferential range around the cover-side bearing 34, at which the reaction force is exerted to the cover 24 through the cover-side bearing 34 upon rotation of the actuator lever 13, is defined as a reaction force generation range B. That is, the bearing support range A, which is from the exerting direction Fo to the exerting direction Fx, is defined as the reaction force generation range B.

The cover 24 is made of a resin material. The resin material of the cover 24 is used to insert-mold motor terminals 51 that supply an electric power to the electric motor 21, and the resin material of the cover 24 forms the connector 43 to be connected with an external device.

Specifically, relay terminals 52, which are connected to power supply terminals 21b of the electric motor 21 to make an electrical connection therewith; a base end part of the magnetic sensing device 37; sensor terminals 53, which are electrically connected to the magnetic sensing device 37; a plurality of collars 54, which are made of metal and respectively receive the bolts 42 for fixing the cover 24 to the housing 20; and a bearing holder 55, which is made of metal and receives the cover-side bearing 34 press-fitted thereto, are insert-molded at the cover 24 besides the motor terminals 51.

When the cover 24 is made of the resin material, the weight of the electric actuator 11 can be reduced, and the manufacturing costs of the cover 24 can be limited.

However, since the cover 24 is made of the resin material, there is concern that the strength of the bearing support range A of the cover 24, which supports the cover-side bearing 34, is insufficient. Particularly, there is concern that the strength of the reaction force generation range B is insufficient.

In view of the above concerns, according to the present embodiment, reinforcing ribs R, each of which outwardly extends in a streak form from the cover-side bearing 34 in an outer radial direction (i.e., in a radial direction), are formed at least in the reaction force generation range B at the portion of the cover 24, which is located around the cover-side bearing 34. Specifically, the reinforcing ribs R are formed in the reaction force generation range B of the cover 24.

Each of the reinforcing ribs R has a cross section that is shaped into a form of a projection, which projects upwardly. In the present embodiment, the reinforcing ribs R radially extend along the circumference of the cover-side bearing 34. The reinforcing ribs R are formed in one piece with the cover 24 by the resin material of the cover 24.

An interval between each adjacent two of the reinforcing ribs R, a thickness of each reinforcing rib R, and a height of each reinforcing rib R are set to achieve a sufficient strength even upon application of the reaction force F.

Figure 4:
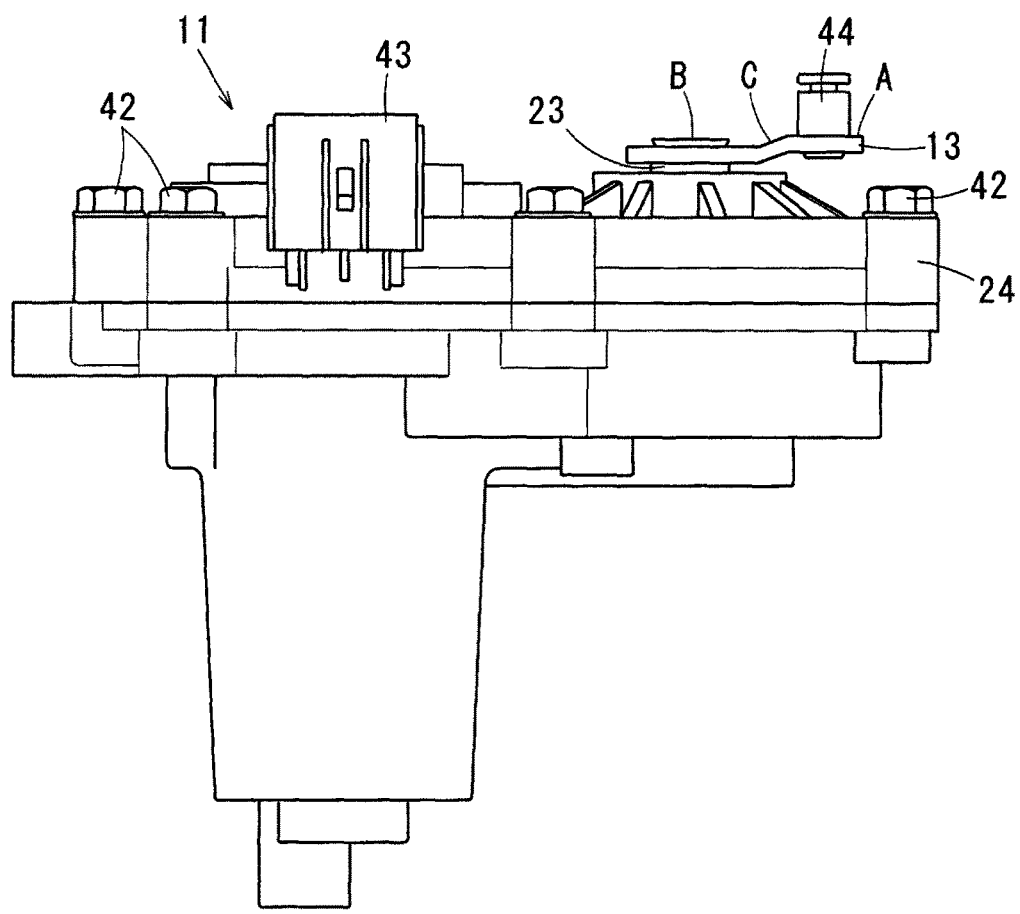
FIG. 4 is a side view of the electric actuator of the first embodiment.
Figure 5:
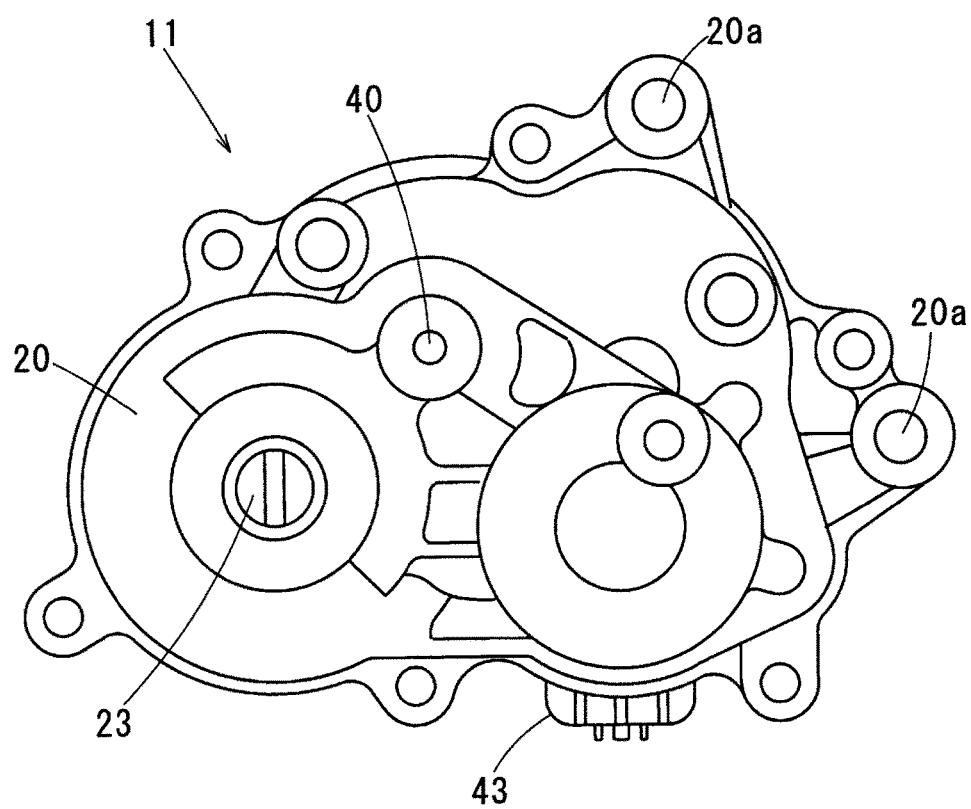
FIG. 5 is a bottom view of the electric actuator of the first embodiment.
Figure 6:
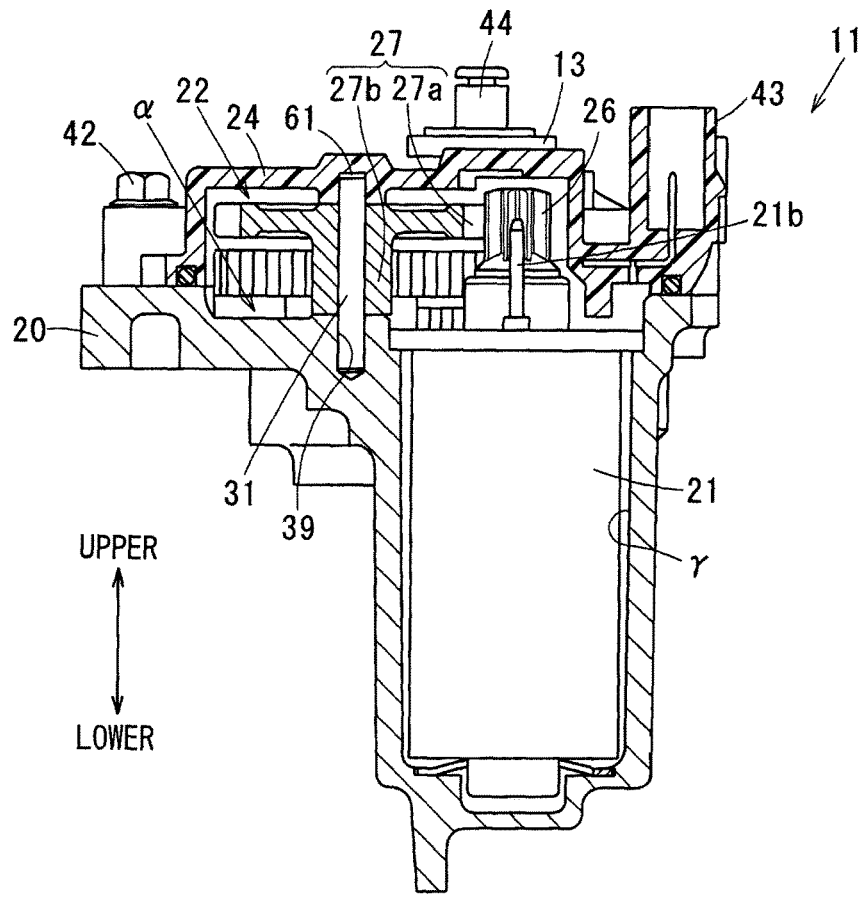
FIG. 6 is a cross-sectional view taken along line VI-VI in FIG. 3.

This point will be specifically described. The stress, which is generated by the reaction force F at the cover 24, is increased toward the cover-side bearing 34 and is reduced toward the radially outer side, which is away from the cover-side bearing 34, due to dispersion of the stress. In view of the above point, in the present embodiment, as shown in FIG. 4, the height of the reinforcing rib R is increased toward the cover-side bearing 34 and is reduced toward the radially outer side, which is away from the cover-side bearing 34.

The ribs R are not necessarily limited to the ribs that show the change in the height direction. As another specific example, the thickness of the reinforcing rib R may be increased toward the cover-side bearing 34 and may be reduced toward the radially outer side, which is away from the cover-side bearing 34.

(Advantages)

In the present embodiment, as discussed above, the reinforcing ribs R are formed at least in the reaction force generation range B of the cover 24. The strength of the reaction force generation range B of the cover 24 can be improved by the reinforcing ribs R. Therefore, it is possible to avoid a damage, such as deformation, a crack, at the resin cover 24 caused by the reaction force F applied to the cover 24.

Therefore, the long term reliability of the electric actuator 11 can be ensured while the cover 24 is made of the resin.

(Second Characteristic Technique)

In the following discussion, the extending direction of the reinforcing rib R will be referred to as a rib longitudinal direction.

Furthermore, the exerting direction of the maximum reaction force F in the reaction force generation range B will be referred to as a maximum reaction force direction Fmax.

Specifically, the electric actuator 11 generates the maximum output torque at the time of closing the bypass passage 8 with the wastegate valve 9. Therefore, as indicated by a solid line J in FIG. 11, the maximum reaction force F is exerted at the time when the actuator lever 13 is placed at the full closing angle θ0. The exerting direction of the reaction force F at this time is the maximum reaction force direction Fmax.

In the present embodiment, the rib longitudinal direction of one reinforcing rib R among the plurality of reinforcing ribs R is set to coincide with the maximum reaction force direction Fmax.

Now, one specific example will be described for the purpose of assisting understanding. Specifically, the rib longitudinal direction of the reinforcing rib R, which is indicated by an arrow Rmax in FIG. 12, coincides with the maximum reaction force direction Fmax shown in FIG. 10.

(Advantages)

By coinciding the maximum reaction force direction Fmax with the rib longitudinal direction of the reinforcing rib R, it is possible to improve the strength of the portion of the cover 24, at which the maximum reaction force F is exerted at the cover 24.

This makes it possible to avoid rupture of the cover 24 caused by the application of the local reaction force F to a part of the cover 24. That is, the rupture resistance of the cover 24 can be improved.

(Third Characteristic Technique)

Hereinafter, an exerting direction of the reaction force F, in which the reaction force F is exerted at the highest frequency in the reaction force generation range B, will be referred to as a high frequency direction Fa.

Specifically, the electric actuator 11 controls the boost pressure of the turbocharger T by adjusting the opening degree of the bypass passage 8 through the wastegate valve 9. That is, the angle of the actuator lever 13 changes depending on the operational state of the engine 1. Thus, as indicated by a dotted line H in FIG. 11, the operational angles of the actuator lever 13 include operational angles, at each of which the corresponding frequency is relatively high, and operational angles, at each of which the corresponding frequency is relatively low. Here, the operational angle, at which the frequency is the highest, will be referred to as a high frequency angle θa. The exerting direction of the reaction force F at the high frequency angle θa is the high frequency direction Fa.

In the present embodiment, the rib longitudinal direction of the one reinforcing rib R among the plurality of reinforcing ribs R is set to coincide with the high frequency direction Fa.

Now, one specific example will be described for the purpose of assisting clear understanding. Specifically, the rib longitudinal direction of the reinforcing rib R, which is indicated by an arrow Ra in FIG. 12, coincides with the high frequency direction Fa shown in FIG. 10.

(Advantages)

By coinciding the high frequency direction Fa with the rib longitudinal direction of the reinforcing rib R, it is possible to improve the strength of the portion of the cover 24, at which the largest amount of fatigue is accumulated at the cover 24.

This makes it possible to avoid the damage of the cover 24, such as the deformation, the crack, caused by accumulation of the fatigue at the portion of the cover 24. That is, the fatigue resistance of the cover 24 can be improved.

(Fourth Characteristic Technique)

The electric actuator 11 includes the rotational angle sensor 35 that senses the rotational angle of the output shaft 23.

The rotational angle sensor 35 includes: the magnetic flux generating portion 36, which is rotated integrally with the output shaft 23; and the magnetic sensing device 37, which is installed to one of the cover 24 or the housing 20 and senses the magnetic flux generated from the magnetic flux generating portion 36. In this embodiment, there is described the example where the magnetic sensing device 37 is installed to the cover 24.

A gear range θ1, in which the final gear 29 of the speed reducing device 22 is placed, and a sensing range θ2, in which the magnetic flux generating portion 36 is placed, exist separately from each other around the output shaft 23. That is, the gear range θ1 and the sensing range θ2 are set such that the gear range θ1 and the sensing range θ2 do not overlap with each other in the view taken in the axial direction of the output shaft 23.

(Advantages)

In a case where mechanical lock occurs at the electric actuator 11, the abnormality can be sensed with the rotational angle sensor 35.

The opening degree of the wastegate valve 9 can be obtained based on the rotational angle of the output shaft 23, which is sensed with the rotational angle sensor 35.

The rotational angle sensor 35 is placed at a location which is displaced from the axis of the output shaft 23. In this way, it is not required to place the rotational angle sensor 35 at a shaft end of the output shaft 23. Thereby, a size of the electric actuator 11, which is measured in the axial direction, can be reduced.

Specifically, in the present embodiment, a rotational space, in which the final gear 29 is not formed, is used to place the magnetic flux generating portion 36. Thereby, the size of the electric actuator 11 can be reduced. By reducing the size of the electric actuator 11, the installability of the electric actuator 11 to the intake air compressor 4 can be improved.

(Related Technique of Fourth Characteristic Technique)

The magnetic flux generating portion 36 is insert-molded in the resin component that forms the final gear. The magnetic flux generating portion 36 includes two permanent magnets 71, and two yokes 72 made of magnetic metal, and these permanent magnets 71 and the yokes 72 are combined to form a closed magnetic circuit. The two yokes 72 are shaped into arcuate forms, respectively, which have different radii of curvature, and these two yokes 72 are combined.

The type of permanent magnet 71 is not necessarily limited to any particular one and may be, for example, a rare-earth magnet or a ferrite magnet.

The two yokes 72 are components that are made of iron and are shaped into the arcuate forms, respectively, which have the different radii of curvature. One end parts of the two yokes 72 clamp one of the permanent magnets 71, and the other end parts of the two yokes 72 clamp another one of the permanent magnets 71.

An arcuate gap δ, into which the magnetic sensing device 37 is inserted, is formed between the two yokes 72. The arcuate gap δ forms an arc that is coaxial with the central axis of the output shaft 23. A gap width between the two yokes 72 is set to be constant in the radial direction. The arcuate gap δ is set such that even when the magnetic flux generating portion 36 is rotated in response to the rotation of the output shaft 23, the magnetic flux generating portion 36 maintains a non-contact state relative to the magnetic sensing device 37.

The two permanent magnets 71 are arranged such that polarities of the two permanent magnets 71 are opposite to each other. Specifically, among the two permanent magnets 71, one permanent magnet 71 has the S-pole that faces the output shaft 23. Furthermore, among the two permanent magnets 71, the other permanent magnet 71 has the N-pole that faces the output shaft 23. With the above-described construction, there is formed the closed magnetic circuit, in which the magnetic flux flows through the one permanent magnet 71, the outer side yoke 72, the other permanent magnet 71, and the inner side yoke 72 in this order.

A portion of the magnetic flux, which is generated at the magnetic flux generating portion 36, passes through the magnetic sensing device 37 inserted into the arcuate gap δ. Specifically, a portion of the magnetic flux of one of the yokes 72 flows into the other one of the yokes 72 through the magnetic sensing device 37. The magnetic sensing device 37 includes a Hall IC that generates a signal, which corresponds to the magnetic flux passing through the Hall IC. Therefore, when the magnetic flux generating portion 36 is rotated in response to the rotation of the output shaft 23, the amount of magnetic flux, which passes through the Hall IC, changes, and thereby the output signal of the magnetic sensing device 37 changes. The ECU 12 obtains an angle of the output shaft 23 based on the signal inputted from the magnetic sensing device 37.

(Advantages)

When the magnetic flux generating portion 36, which forms the closed magnetic circuit, is used, it is possible to make it less susceptible to external magnetic influences, such as magnetic noises, which are applied from the outside. Thereby, the sensing accuracy of the rotational angle sensor 35 for sensing the rotational angle of the output shaft 23 can be improved.

(Fifth Characteristic Technique)

The cover 24 is made of the resin material, as discussed above.

The magnetic sensing device 37 is insert-molded by the resin material of the cover 24.

(Advantages)

Since the magnetic sensing device 37 is insert-molded in the cover 24, the number of components assembled to the housing 20 can be reduced.

Second Embodiment

A second embodiment will be described with reference to FIGS. 14 and 15. In the following description, the same reference signs, which are the same as those of the first embodiment, indicate the same functional portions, which are the same as those of the first embodiment. Furthermore, in the following description, only modified portions, which are modified from the first embodiment, are disclosed, and portions, which are not discussed in the second embodiment, have the same configurations as those of the first embodiment.

In the second embodiment, in the portion of the cover 24, which is located around the cover-side bearing 34, at least the reaction force generation range B has a thick wall portion D, which has a wall thickness that is larger than an average wall thickness W of the cover 24. Specifically, the thick wall portion D is formed in at least the reaction force generation range B in the cover 24.

Figure 14:
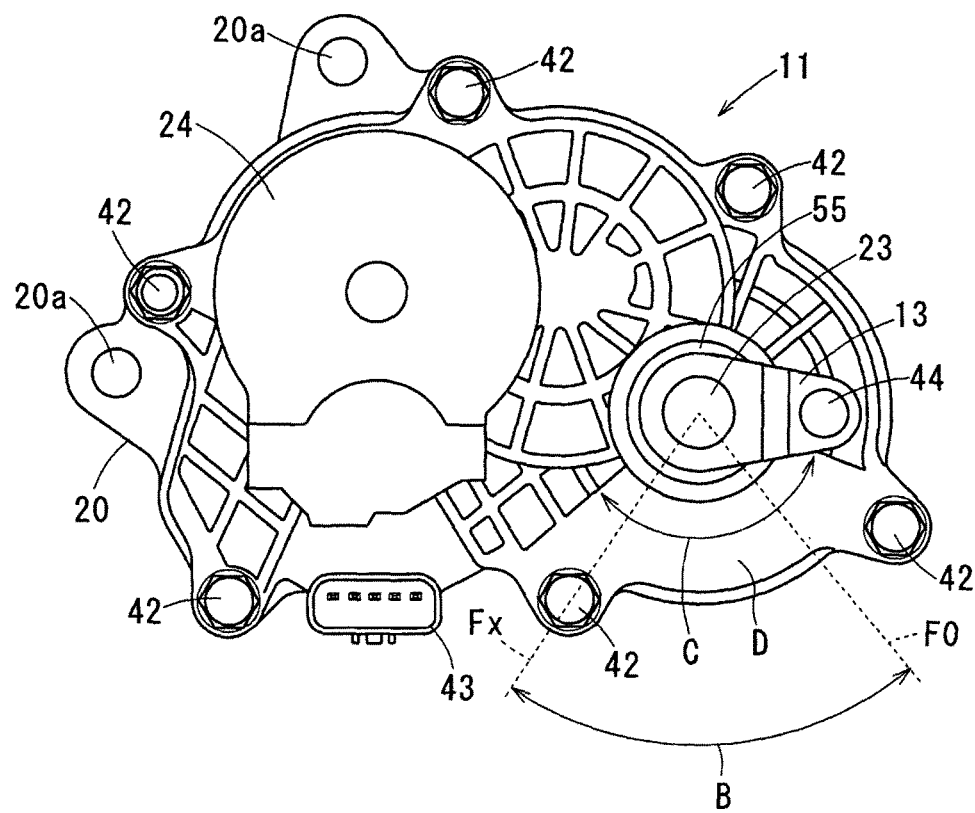
FIG. 14 is a top view of an electric actuator according to a second embodiment of the present disclosure.
Figure 15:
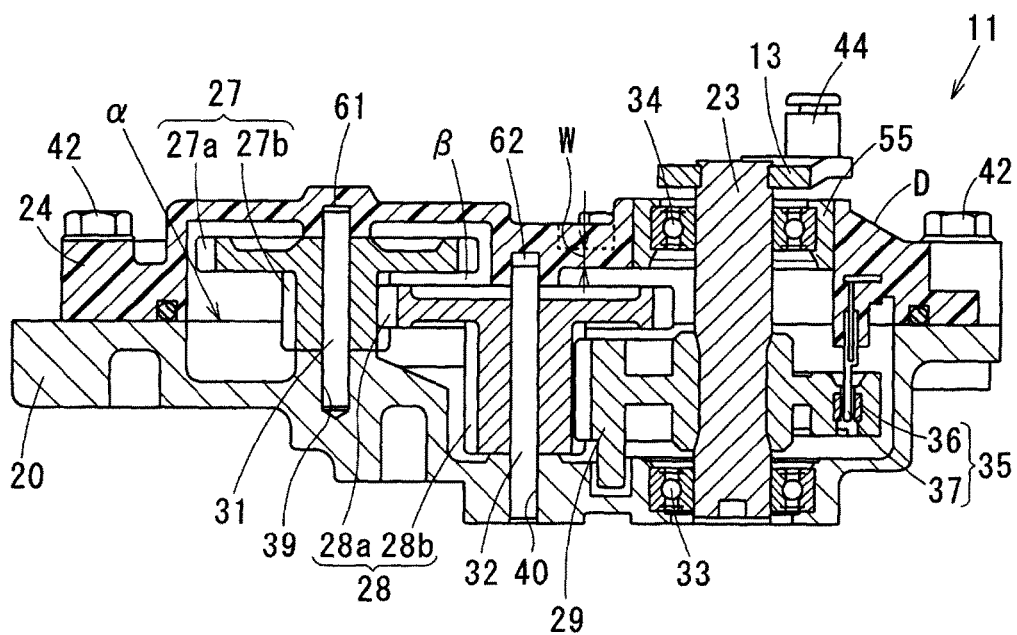
FIG. 15 is a cross-sectional view of the electric actuator of the second embodiment.

In FIG. 14, a reference sign C indicates a thick wall forming range, in which the thick wall portion D is formed in the radial direction around the cover-side bearing 34. The reaction force generation range B is included in the thick wall forming range C.

(Advantages)

When the thick wall portion D is formed in the cover 24, advantages, which are similar to those of the first embodiment, can be obtained.

Here, it should be noted that a wall thickness in the maximum reaction force direction Fmax may be increased in comparison to the other part of the thick wall portion D.

Similarly, a wall thickness in the high frequency direction Fa may be increased in comparison to the other part of the thick wall portion D.

Also, it should be understood that the first embodiment and the second embodiment may be combined.

Other Embodiments

In the above embodiment, the electric actuator 11 for driving the wastegate valve 9 is exemplified. However, the drive subject of the electric actuator 11 is not necessarily limited to the wastegate valve 9. One specific example is as follows. That is, the electric actuator 11 may drive a flow passage change valve that opens and closes a second exhaust gas scroll provided at the turbine housing 6b. It should be understood that the electric actuator 11 may be used to drive both of the wastegate valve 9 and the flow passage change valve.

In the above embodiments, there is described the example where the present invention is applied to the electric actuator 11 that is used for the turbocharger T. Alternatively, the present invention may be applied to an electric actuator 11 that is used for a different application, which is other than the turbocharger T.

In the above embodiments, the speed reducing device 22 of the parallel shaft type, which has the three speed reducing stages, is described as the specific example of the speed reducing device 22. The number of the speed reducing stages is not necessarily limited to three and may be changed to equal to or larger than four. That is, the speed reducing device may have three or more intermediate shafts.

Furthermore, the speed reducing device 22 is not necessarily limited to the speed reducing gear device of the parallel shaft type.

The invention claimed is:

1. An electric actuator comprising:
   an electric motor that converts an electric power into a rotational output;
   a housing, in which the electric motor is fixed;
   a speed reducing device that reduces a rotational speed of the rotational output generated by the electric motor;
   an output shaft that is driven by the rotational output, the rotational speed of which is reduced by the speed reducing device;
   a cover that is assembled to the housing;
   a housing-side bearing that is placed between the housing and the output shaft and rotatably supports the output shaft relative to the housing;
   a cover-side bearing that is placed between the cover and the output shaft and rotatably supports the output shaft to the cover; and
   an actuator lever that extends in a radial direction from the output shaft and transmits the rotational output of the output shaft to a subject, which transmits a drive force, wherein:
   a force, which is applied from the output shaft at a time of transmitting the drive force from the output shaft to the subject, is defined as a reaction force;
   in an area around the cover-side bearing, a range, in which the reaction force is applied to the cover upon rotation of the actuator lever, is defined as a reaction force generating range;
   the cover is made of a resin material; and
   a reinforcing, which extends from the cover-side bearing in the radial direction, is formed at least in the reaction force generating range of the cover in the area around the cover-side bearing.

2. The electric actuator according to claim 1, wherein:
   a direction, in which the reinforcing rib extends, is defined as a rib longitudinal direction;
   a direction, in which a maximum reaction force is generated in the reaction force generating range, is defined as a maximum reaction force direction; and
   the rib longitudinal direction of the reinforcing rib coincides with the maximum reaction force direction.

3. The electric actuator according to claim 1, wherein:
   a direction, in which the reinforcing rib extends, is defined as a rib longitudinal direction;
   a direction, in which the reaction force is generated at a maximum frequency in the reaction force generating range, is defined as a high frequency direction; and
   the rib longitudinal direction of the reinforcing rib coincides with the high frequency direction.

4. The electric actuator according to claim 1, wherein:
   the electric actuator comprises a rotational angle sensor that senses a rotational angle of the output shaft;
   the rotational angle sensor includes:
   a magnetic flux generating portion that is rotated integrally with the output shaft; and
   a magnetic sensing device that is supported by one of the cover or the housing and senses a magnetic flux generated by the magnetic flux generating portion; and
   a gear range, in which a final gear of the speed reducing device is formed, and a sensing range, in which the magnetic flux generating portion is formed, are provided separately relative to each other in the area around the output shaft.

5. The electric actuator according to claim 4, wherein the magnetic sensing device is molded by a resin material of the cover.

6. An electric actuator comprising:
- an electric motor that converts an electric power into a rotational output;
- a housing, in which the electric motor is fixed;
- a speed reducing device that reduces a rotational speed of the rotational output generated by the electric motor;
- an output shaft that is driven by the rotational output, the rotational speed of which is reduced by the speed reducing device;
- a cover;
- a housing-side bearing that is placed between the housing and the output shaft and rotatably supports the output shaft relative to the housing;
- a cover-side bearing that is placed between the cover and the output shaft and rotatably supports the output shaft; and
- an actuator lever that extends in a radial direction from the output shaft and transmits the rotational output of the output shaft to a subject, which transmits a drive force, wherein:
- a force, which is applied from the output shaft to the cover-side bearing at a time of transmitting the drive force from the output shaft to the subject through the actuator lever, is defined as a reaction force;
- in an area around the cover-side bearing, a range, in which the reaction force is applied to the cover through the cover-side bearing upon rotation of the actuator lever, is defined as a reaction force generating range;
- the cover is made of a resin material; and
- a thick wall portion, which has a wall thickness larger than an average wall thickness of the cover, is formed at least in the reaction force generating range of the cover in the area around the cover-side bearing.

* * * * *